United States Patent
Fletcher et al.

(10) Patent No.: US 9,598,837 B2
(45) Date of Patent: Mar. 21, 2017

(54) EXCAVATION SYSTEM PROVIDING AUTOMATED STALL CORRECTION

(71) Applicant: Caterpillar Inc., Peoria, IL (US)

(72) Inventors: Jeffrey Graham Fletcher, Peoria, IL (US); Daniel Aaron Jones, Tasmania (AU); Ricky Kam Ho Chow, Queensland (AU); Ranishka De Silva Hewavisenthi, Queensland (AU)

(73) Assignee: Caterpillar Inc., Peoria, IL (US)

( * ) Notice: Subject to any disclaimer, the term of this patent is extended or adjusted under 35 U.S.C. 154(b) by 23 days.

(21) Appl. No.: 14/790,098

(22) Filed: Jul. 2, 2015

(65) Prior Publication Data
US 2017/0002544 A1    Jan. 5, 2017

(51) Int. Cl.
*E02F 9/20* (2006.01)
*E02F 9/22* (2006.01)
(Continued)

(52) U.S. Cl.
CPC ........... *E02F 9/2037* (2013.01); *B60W 10/04* (2013.01); *B60W 10/18* (2013.01); *B60W 10/30* (2013.01);
(Continued)

(58) Field of Classification Search
CPC ..... E02F 9/2029; E02F 9/2083; E02F 9/2062; B60W 10/18; B60W 30/1886;
(Continued)

(56) References Cited

U.S. PATENT DOCUMENTS

| | | |
|---|---|---|
| 5,065,326 A | 11/1991 | Sahm |
| 5,293,944 A | 3/1994 | Matsumoto |

(Continued)

FOREIGN PATENT DOCUMENTS

| | | |
|---|---|---|
| CN | 103292715 | 9/2013 |
| WO | WO 2010/074003 A1 | 7/2010 |

OTHER PUBLICATIONS

U.S. Patent Application entitled "Excavation System Providing Automated Tool Linkage Calibration" filed on Jul. 7, 2015 by Jeffrey Graham Fletcher et al.

(Continued)

*Primary Examiner* — Tyler J Lee
(74) *Attorney, Agent, or Firm* — Finnegan, Henderson, Farabow, Garrett & Dunner, LLP (57) ABSTRACT

An excavation system is disclosed for a machine having a work tool. The excavation system may have first and second actuators configured to move the work tool in first and second directions, at least a first valve configured to regulate fluid flow through the first actuator, and at least a second valve configured to regulate fluid flow through the second actuator. The excavation system may also have at least one sensor to generate a first signal indicative of a performance of the first actuator, and a controller in communication with the at least a first valve, the at least a second valve, and the at least one sensor. The controller may be configured to make a first determination that the first actuator is experiencing a stall condition based on the first signal, and to selectively command neutralization of the powertrain and movement of the second actuator based on the first determination.

22 Claims, 3 Drawing Sheets

(51) Int. Cl.
*F15B 21/08* (2006.01)
*B60W 30/188* (2012.01)
*B60W 10/18* (2012.01)
*B60W 10/04* (2006.01)
*B60W 10/30* (2006.01)

(52) U.S. Cl.
CPC .... *B60W 30/1884* (2013.01); *B60W 30/1886* (2013.01); *E02F 9/2025* (2013.01); *E02F 9/2029* (2013.01); *E02F 9/2062* (2013.01); *E02F 9/2083* (2013.01); *B60W 2400/00* (2013.01); *B60W 2710/305* (2013.01)

(58) Field of Classification Search
CPC .. B60W 30/1884; B60W 10/04; B60W 10/30; B60W 2400/00; B60W 2710/305
USPC ............................................................ 701/50
See application file for complete search history.

(56) References Cited

U.S. PATENT DOCUMENTS

| | | | |
|---|---|---|---|
| 5,535,532 A | 7/1996 | Fujii et al. | |
| 5,617,724 A | 4/1997 | Ko | |
| 5,960,378 A | 9/1999 | Watanabe et al. | |
| 5,968,103 A | 10/1999 | Rocke | |
| 5,974,352 A | 10/1999 | Shull | |
| 6,205,687 B1 | 3/2001 | Rocke | |
| 6,321,152 B1* | 11/2001 | Amborski | E02F 9/2221 60/422 |
| 6,321,153 B1 | 11/2001 | Rocke et al. | |
| 6,363,632 B1 | 4/2002 | Stentz et al. | |
| 6,615,114 B1 | 9/2003 | Skiba et al. | |
| 6,775,974 B2* | 8/2004 | Tabor | F15B 9/09 60/422 |
| 6,879,899 B2 | 4/2005 | Budde | |
| 7,260,931 B2* | 8/2007 | Egelja | E02F 9/2203 60/422 |
| 7,555,855 B2 | 7/2009 | Alshaer et al. | |
| 7,640,683 B2 | 1/2010 | McCain | |
| 7,658,234 B2 | 2/2010 | Brandt et al. | |
| 7,797,934 B2 | 9/2010 | Bacon et al. | |
| 7,853,382 B2* | 12/2010 | Anderson | E02F 9/2029 340/684 |
| 7,865,285 B2 | 1/2011 | Price et al. | |
| 8,042,290 B2 | 10/2011 | Hartwick | |
| 8,145,394 B2 | 3/2012 | Chiorean et al. | |
| 8,160,783 B2 | 4/2012 | Shull | |
| 8,280,596 B2 | 10/2012 | Hagenbuch | |
| 8,340,875 B1* | 12/2012 | Shatters | E02F 3/432 701/50 |
| 8,363,210 B2 | 1/2013 | Montgomery | |
| 8,478,492 B2 | 7/2013 | Taylor et al. | |
| 8,527,155 B2 | 9/2013 | Gudat | |
| 8,654,608 B2 | 2/2014 | Lindskov | |
| 8,726,647 B2 | 5/2014 | Peterson et al. | |
| 8,813,486 B2 | 8/2014 | Peterson et al. | |
| 8,838,329 B2 | 9/2014 | Seki | |
| 8,874,265 B2 | 10/2014 | Rakshit | |
| 8,886,493 B2 | 11/2014 | Taylor | |
| 8,903,689 B2 | 12/2014 | Dunbabin et al. | |
| 2002/0108486 A1* | 8/2002 | Sannomiya | E02F 9/2217 91/436 |
| 2007/0074510 A1* | 4/2007 | VerKuilen | F15B 11/006 60/422 |
| 2012/0055051 A1 | 3/2012 | Polston et al. | |
| 2013/0158789 A1 | 6/2013 | Seki | |
| 2014/0277957 A1 | 9/2014 | Clar et al. | |

OTHER PUBLICATIONS

U.S. Patent Application entitled "Excavation System Providing Impact Detection" filed on Jul. 7, 2015 by Jeffrey Graham Fletcher et al.
U.S. Application entitled "Excavation System Having Adaptive Dig Control" filed on Jul. 7, 2015 by Jeffrey Graham Fletcher et al.
U.S. Application entitled "Excavation System Having Velocity Based Work Tool Shake" filed on Jul. 7, 2015 by Jeffrey Graham Fletcher et al.

* cited by examiner

EXCAVATION SYSTEM PROVIDING AUTOMATED STALL CORRECTION

TECHNICAL FIELD

The present disclosure is directed to an excavation system and, more particularly, to an excavation system providing automated stall correction.

BACKGROUND

Heavy equipment, such as load-haul-dump machines (LHDs), wheel loaders, carry dozers, etc., are used during an excavation process to scoop up loose material from a pile at a first location (e.g., within a mine tunnel), to haul the material to a second location (e.g., to a crusher), and to dump the material. A productivity of the excavation process can be affected by how well power produced by an engine of each machine is used to move material during the excavation cycle. In particular, the engine of the machine can be used to drive a pump that pressurizes fluid directed into or through actuators that propel the machine or move a work tool of the machine. When the actuators are powered by the pressurized fluid to move the material in a desired manner, the efficiency of the machine and the productivity of the process are both improved.

During machine and/or work tool movement, however, it may be possible for the actuators to stall. For example, during engagement of the work tool with a pile of material, it may be possible for the work tool to engage an immovable object. When this happens, the pump may still be pressurizing fluid and directing fluid to the actuator according to operator demand, but the actuator may not be capable of movement. While some of this fluid may find leak paths through the actuator, the majority of the fluid will be forced to spill over relief valves as fluid pressures associated with the actuator rise during the stall. The leakage and spillage of high-pressure fluid is wasteful and reduces the machine's efficiency.

One attempt to improve machine efficiency during stall is disclosed in U.S. Pat. No. 8,726,647 of Peterson et al. that issued on May 20, 2014 ("the '647 patent"). In particular, the '647 patent discloses a hydraulic control system having a first fluid actuator, a second fluid actuator, a pressure sensor, a velocity sensor, and a controller. The controller is configured to receive input indicative of a desired flow rate for the first fluid actuator, to determine an actual flow rate based on the velocity, and determine a stall condition of the first fluid actuator based on the desired flow rate, the actual flow rate, and the pressure. The controller is also configured to selectively divert fluid away from the first fluid actuator and to the second fluid actuator based on the stall condition of the first fluid actuator.

Although the hydraulic control system of the '647 patent may improve efficiencies during a stall condition by diverting otherwise wasted fluid away from a stalled actuator, the hydraulic control system may do little to remedy the stall condition.

The disclosed excavation system is directed to overcoming one or more of the problems set forth above and/or other problems of the prior art.

SUMMARY

One aspect of the present disclosure is directed to an excavation system for a machine having a work tool, a traction device, and a powertrain configured to power the work tool and the traction device. The excavation system may include a first actuator configured to move the work tool in a first direction, at least a first valve configured to regulate fluid flow through the first actuator, and at least one sensor configured to generate a first signal indicative of a performance of the first actuator. The excavation system may also include a second actuator configured to move the work tool in a second direction, at least a second valve configured to regulate fluid flow through the second actuator, and a controller in communication with the at least a first valve, the at least one sensor, and the at least a second valve. The controller may be configured to make a first determination that the first actuator is experiencing a stall condition based on the first signal, and to selectively command neutralization of the powertrain and movement of the second actuator based on the first determination.

Another aspect of the present disclosure is directed to a method of controlling a machine having a powertrain, a work tool, and first and second actuators driven by the powertrain to move the work tool in different directions. The method may include sensing a performance of the first actuator, and making a first determination that the first actuator is experiencing a stall condition based on the sensed performance of the first actuator. The method may further include selectively command neutralization of the powertrain and movement of the second actuator based on the first determination.

Another aspect of the present disclosure is directed to a machine. The machine may include a frame, a work tool, lift arms pivotally connected at a first end to the frame and at a second end to the work tool, lift cylinders connected between the frame and the lift arms, and a tilt cylinder operatively connected between the frame and the lift arms. The machine may also include at least one lift valve configured to regulate fluid flow through the lift cylinders, at least a first sensor configured to generate a first signal indicative of a performance of the lift cylinders, at least one tilt valve configured to regulate fluid flow through the tilt cylinder, and at least a second sensor configured to generate a second signal indicative of a performance of the tilt cylinder. The machine may further include a traction device connected to the frame and configured to propel the machine, a powertrain operable to power the lift and tilt cylinders and the traction device, and a braking system configured to retard the traction device. The machine may additionally include a controller in communication with the at least one lift valve, the at least a first sensor, the at least one tilt valve, the at least a second sensor, the powertrain, and the braking system. The controller may be configured to make a first determination that the lift cylinders are experiencing a stall condition based on the first signal, and to selectively command neutralization of the powertrain and movement of the tilt cylinder based on the first determination. The controller may also be configured to selectively command engagement of the braking system when the powertrain is neutralized to inhibit rolling of the machine, to make a second determination that the lift cylinders are still experiencing the stall condition after neutralization of the powertrain, and to selectively command neutralization of the powertrain and disengagement the braking system based on the second determination to allow the machine to roll away from a material engaged by the work tool. The controller may be further configured to selectively command movements of the lift and tilt cylinders during neutralization of the powertrain and disengagement of the braking system to reposition the work tool as the work tool moves away from the material.

DETAILED DESCRIPTION

Figure 1:
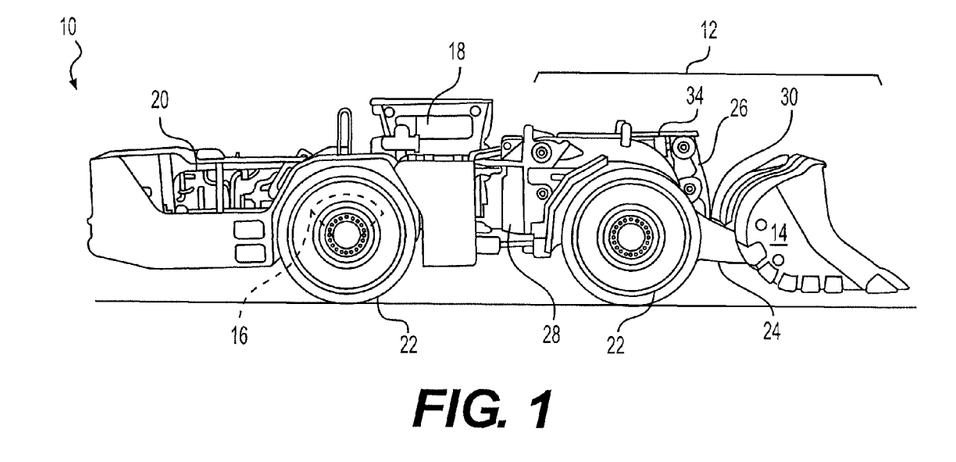
FIGS. 1 and 2 are side and top-view diagrammatic illustrations, respectively, of an exemplary disclosed machine operating at a worksite.
Figure 2:
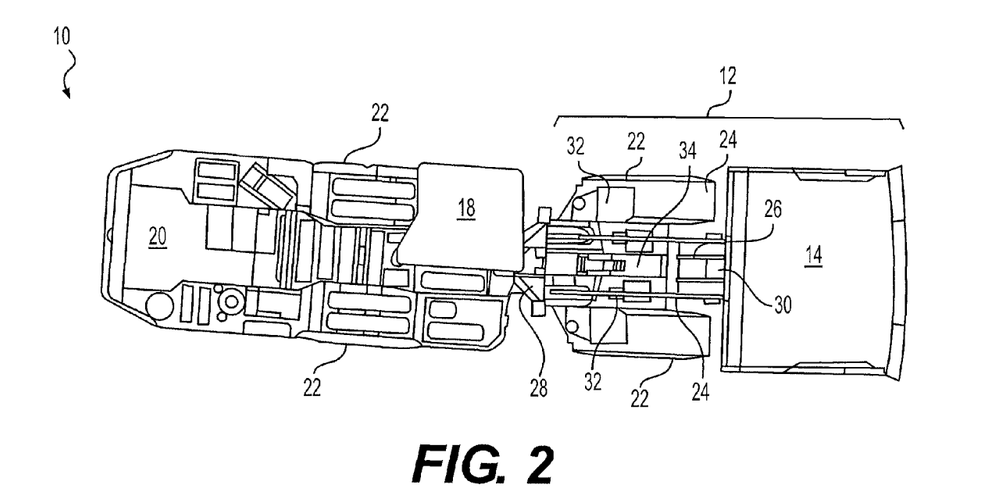

FIGS. 1 and 2 illustrate an exemplary machine 10 having multiple systems and components that cooperate to move material such as ore, overburden, waste, etc. In the disclosed example, machine 10 is a load-haul-dump machine (LHD). It is contemplated, however, that machine 10 could embody another type of excavation machine (e.g., a wheel loader or a carry dozer), if desired. Machine 10 may include, among other things, a linkage arrangement 12 configured to move a work tool 14, a braking system 16 configured to slow and stop movement of machine 10, an operator station 18 for manual control of linkage arrangement 12 and braking system 16, and a powertrain 20 that provides electrical, hydraulic, and/or mechanical power to linkage arrangement 12, braking system 16, and operator station 18. In addition to powering linkage arrangement 12, braking system 16, and operator station 18, powertrain 20 may also function to propel machine 10, for example via one or more traction devices (e.g., wheels or tracks) 22.

Linkage arrangement 12 may include fluid actuators that exert forces on structural components of machine 10 to cause lifting and tilting movements of work tool 14. Specifically, linkage arrangement 12 may include, among other things, a pair of spaced apart generally plate-like lift arms 24, and a bell crank 26 centered between and operatively connected to lift arms 24. Lift arms 24 may be pivotally connected at a proximal end to a frame 28 of machine 10 and at a distal end to work tool 14. Bell crank 26 may be pivotally connected to work tool 14 directly, or indirectly via a tilt link 30. A pair of substantially identical lift cylinders 32 (shown only in FIG. 2) may be pivotally connected at a first end to frame 28 and at an opposing second end to lift arms 24. A tilt cylinder 34 may be located between lift arms 24 and pivotally connected at a first end to frame 28 and at an opposing second end to bell crank 26. With this arrangement, extensions and retractions of lift cylinders 32 may function to raise and lower lift arms 24, respectively, along with connected work tool 14, bell crank 26, and tilt link 30. Similarly, extensions and retractions of tilt cylinder 34 may function to rack and dump work tool 14, respectively. This arrangement may be recognized as similar to a commonly known Z-bar linkage. It is contemplated, however, that machine 10 could have another linkage arrangement, if desired.

Numerous different work tools 14 may be attachable to a single machine 10 and controllable via operator station 18. Work tool 14 may include any device used to perform a particular task such as, for example, a bucket (shown in FIGS. 1 and 2), a fork arrangement, a blade, a shovel, a crusher, a shear, a grapple, a grapple bucket, a magnet, or any other task-performing device known in the art. Although connected in the embodiment of FIGS. 1 and 2 to lift and tilt relative to machine 10, work tool 14 may alternatively or additionally rotate, swing, slide, extend, open and close, or move in another manner known in the art.

Braking system 16 may include components that cooperate to decelerate machine 10 in response to input received via operator station 18. These components may include, for example, one or more brakes associated with any combination of traction devices 22. In the disclosed embodiment, braking system 16 includes one brake located at each traction device 22 (i.e., at least two brakes per axle of machine 10). The brakes may include internal wet brakes or external dry brakes. When engaged, the brakes may retard rotation of traction devices 22. The brakes may be engaged manually and/or automatically based on an electronic command, as desired.

Operator station 18 may be configured to receive input from a machine operator indicative of a desired work tool and/or machine movement. Specifically, operator station 18 may include one or more input devices 36 (shown only in FIG. 3) embodied, for example, as single or multi-axis joysticks located proximal an operator seat (not shown). Input devices 36 may be proportional-type controllers configured to position and/or orient work tool 14, to cause acceleration of machine 10, and/or to brake machine 10 by producing signals that are indicative of a desired speeds and/or forces in particular directions. The position signals may be used to actuate any one or more of lift and tilt cylinders 32, 34, braking system 16, and powertrain 20. It is contemplated that different input devices may additionally or alternatively be included within operator station 18 such as, for example, wheels, knobs, push-pull devices, switches, pedals, and other operator input devices known in the art. It is contemplated that operator station 18 could be omitted in applications where machine 10 is remotely or autonomously controlled, if desired.

Powertrain 20 may be supported by frame 28 of machine 10, and configured to generate the electrical, hydraulic, and/or mechanical power discussed above. Powertrain 20 may include any combination of an engine (e.g., a diesel engine), a torque converter (not shown), a transmission (e.g., a mechanical step-change, continuously variable, or hybrid transmission—not shown), a differential (not shown), one or more motors (e.g., electric or hydraulic motors—not shown), axles (not shown), a final drive (not shown), and/or any other known component that functions to transmit a torque through traction devices 22. When powertrain 20 is engaged, traction devices 22 may exert a torque on a ground surface below machine 10 that propels machine 10. When powertrain 20 is neutralized, traction devices 22 may be allowed to roll freely (minus the effects of friction and/or braking) relative to the ground surface. Neutralization may occur in many different ways, for example by placing the transmission in a neutral gear setting, by reducing engine fueling, through the use of a torque converter clutch, etc. In either state (i.e., in the engaged state or the neutralized state), powertrain 20 may still power additional components of machine 10. It should be noted that, when powertrain 20 is neutralized, the power normally directed from the engine through the transmission to traction devices 22 may be available for other purposes (e.g., to drive the additional components of machine 10). Powertrain 20 may be shifted between states manually (e.g., by a local or remote operator) or automatically based on an electronic command.

Lift and tilt cylinders 32, 34 may each be a linear type of actuator consisting of a tube and a piston assembly arranged within the tube to form opposing control chambers. The control chambers may each be selectively supplied with pressurized fluid and drained of the pressurized fluid to cause the piston assembly to displace within the tube, thereby changing an effective length of lift and tilt cylinders 32, 34 and moving work tool 14. A flow rate of fluid into and out of the control chambers may relate to a translational speed of the cylinders, while a pressure differential between the control chambers may relate to a force imparted by the cylinders on the associated structure of linkage arrangement 12. It is contemplated that lift and/or tilt cylinders 32, 34 could be replaced with another type of actuator (e.g., a rotary actuator), if desired.

Figure 3:
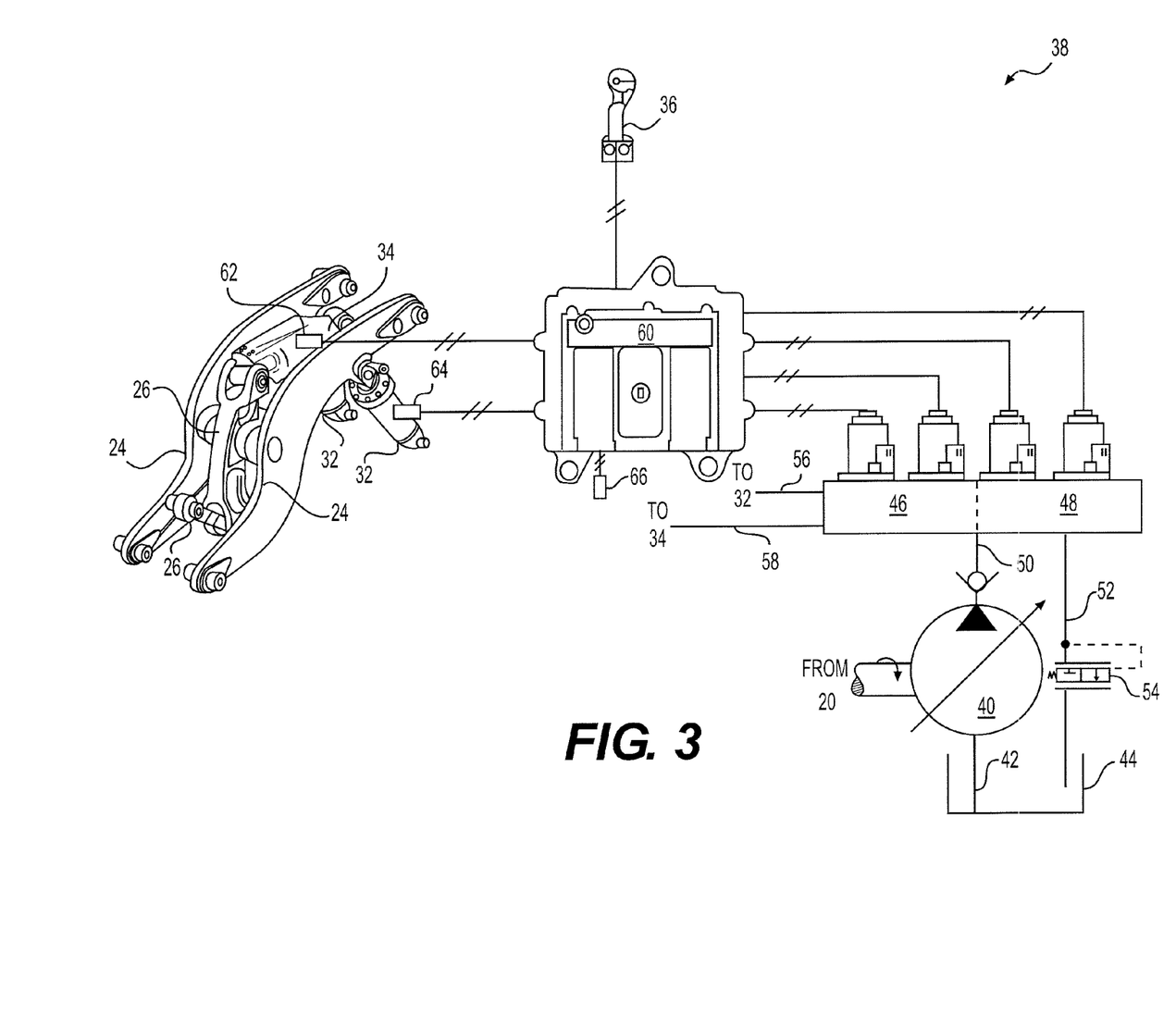
FIG. 3 is a diagrammatic illustration of an exemplary disclosed excavation system that may be used in conjunction with the machine of FIGS. 1 and 2.

As illustrated in FIG. 3, lift and tilt cylinders 32, 34 and input device 36 may form portions of an excavation system ("system") 38. System 38 may include one or more fluid circuits that distribute pressurized oil used to drive the cylinders described above in response to received input. In particular, system 38 may include, among other things, a common pump 40 connected via a suction passage 42 to a common low-pressure reservoir 44, and one or more control valves (e.g., one or more lift control valves 46 and one or more tilt control valves 48). Pump 40 may be configured to draw fluid from reservoir 44 via suction passage 42 and to pressurize the fluid. Valves 46, 48 may be connected to pump 40 via a supply passage 50 to receive the pressurized fluid, and also to reservoir 44 via a drain passage 52 and a main relief valve 54. In addition, valves 46, 48 may be connected to the corresponding lift cylinders 32 and tilt cylinder 34 via one or more conduits 56 and 58, respectively. Each control valve 46, 48 may be responsible for connecting supply passage 50 and drain passage 52 to particular control chambers inside the corresponding actuators to cause commanded extensions or retractions of the actuators between opposing end-of-stroke (i.e., maximum and minimum) displacement positions. When a pressure of excavation system 38 exceeds an opening pressure of relief valve 54, relieve valve 54 may move to relieve pressurized fluid back to reservoir 44, thereby limiting a maximum pressure of excavation system 38.

In manually controlled applications, the commands to extend or retract lift and tilt cylinders 32, 34 may be generated via input device 36 and processed by an onboard controller 60. That is, controller 60 may receive the input from operator via device 36, and convert the input into electronic commands directed to valves 46, 48. In remotely or autonomously controlled applications, however, the electronic commands may be directly generated by on-board controller 60 or by another off-board controller (not shown) that is in remote communication with on-board controller 60. Regardless of the application, controller 60 may additionally be configured to monitor the operation of lift and tilt cylinders 32, 34. For example, excavation system 38 may include one or more sensors (e.g., a lift pressure sensor 62, a tilt pressure sensor 64, and a work tool position sensor 66) configured to provide feedback to controller 60 regarding commanded movements.

Controller 60 may embody a single microprocessor or multiple microprocessors that include a means for monitoring operations of machine 10. For example, controller 60 may include a memory, a secondary storage device, a clock, and a processor, such as a central processing unit or any other means for accomplishing a task consistent with the present disclosure. Numerous commercially available microprocessors can be configured to perform the functions of controller 60. It should be appreciated that controller 60 could readily embody a general machine controller capable of controlling numerous other machine functions. Various other known circuits may be associated with controller 60, including signal-conditioning circuitry, communication circuitry, and other appropriate circuitry.

Pressure sensors 62 and 64 may each be associated with a corresponding one of lift and tilt cylinders 32, 34, and configured to generate signals indicative of a pressure of fluid therein. Signals from pressure sensors 62 and 64 may be directed to controller 60 for use in regulating operation of valves 46, 48.

Tool position sensor 66 may embody an extension sensor located internally or externally of one or both of cylinders 32, 34, a rotational position sensor associated with the pivoting motions of linkage arrangement 12, a local or global coordinate position sensor associated with work tool 14, or any other type of sensor known in the art that generates a signal indicative of a position and/or orientation of a tip portion of work tool 14 (referring to FIG. 1). Signals generated by sensor 66 may be sent to controller 60 for further processing. It is contemplated that controller 60 may derive any number of different parameters based on the signals from sensor 66 and, for example, an elapsed period of time (e.g., a time period tracked by an internal or external timer—not shown). In particular, controller 60 could determine position values, orientation values, speed values, acceleration values, etc. Controller 60 may then use this information, along with the pressure signals from sensors 62, 64, to confirm an operational status of excavation system 38. That is, based on the signals generated by sensors 62-66, controller 60 may determine if one or more lift and tilt cylinders 32, 34 is stalled. And from this feedback, controller 60 may selectively implement a stall correction process.

Figure 4:
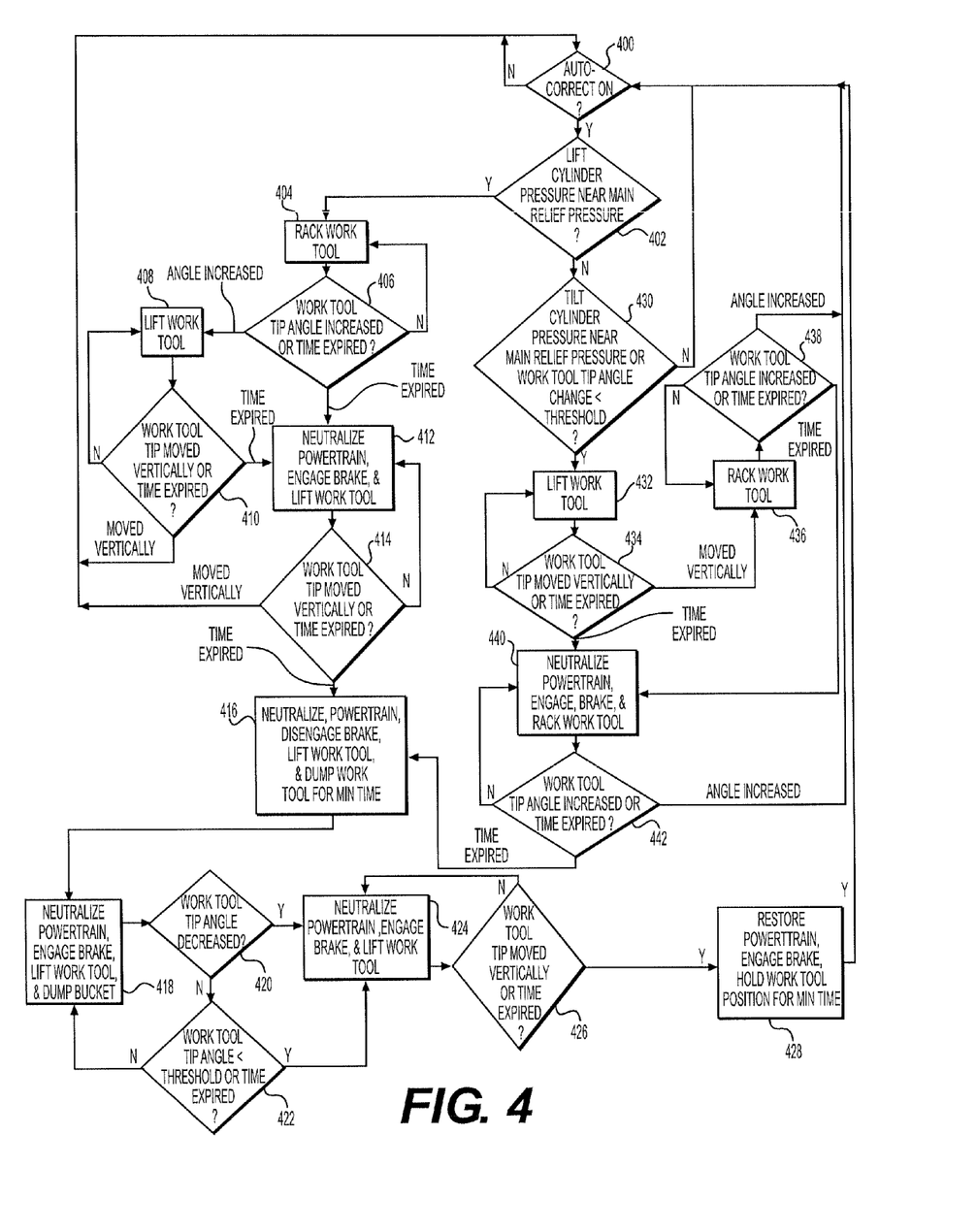
FIG. 4 is a flowchart depicting an exemplary disclosed method that may be performed by the excavation system of FIG. 3.

FIG. 4 illustrates an exemplary stall correction process, wherein controller 60 assumes autonomous control over cylinder movements, powertrain operations, and/or braking operations while attempting to correct a perceived stall condition. FIG. 4 will be discussed in more detail in the following section to further illustrate the disclosed concepts.

INDUSTRIAL APPLICABILITY

The disclosed excavation system finds potential application within any machine at any worksite where it is desirable to provide tool loading assistance and/or automated control. The excavation system finds particular application within an LHD, wheel loader, or carry dozer that has multiple actuators that interact to cooperatively move a work tool. The excavation system may help to correct a perceived stall condition associated with work tool movement, thereby improving an efficiency and productivity of machine 10. Operation of excavation system 38 will now be described in detail with reference to FIG. 4.

Auto-correction of stall conditions may be available during manned, remote, or autonomous control of machine 10. In particular, any time the auto-correct functionality has been turned on, controller 60 may assume automated correction control over stall conditions of excavation system 38. In one embodiment, a local or remote operator may manually activate the auto-correct functionality. In another embodiment, the auto-correct functionality may be automatically activated any time other functions (e.g., digging functions) of machine 10 are being automatically controlled. Accordingly, controller 60 may continuously check the status of the auto-correct function (Step 400), and only proceed with the method of FIG. 4 when the auto-correct function is on (Step 400: Y).

During operation of machine 10, while the auto-correct function is on, controller 60 may continuously monitor linkage performance conditions indicative of stall. In one example, controller 60 may monitor a pressure (e.g., a head-end pressure) of lift cylinders 32 (e.g., via sensor 64), and compare the monitored pressure to the opening pressure of a relief valve (e.g., main relief valve 54 or a lift-specific relief valve—not shown) (Step 402). When the pressure of lift cylinders 32 is near the relief valve opening pressure (e.g., within about 5-15%), controller 60 may determine that work tool 14 has engaged a heavy or fixed object and has stalled (i.e., that lift cylinders 32 have stopped moving, even though movement is being requested). When this occurs, controller 60 may attempt to correct the stall condition (e.g., to dislodge work tool 14 from the object or to otherwise loosen the object from its surroundings such that lift cylinder movement may commence) by first commanding racking of work tool 14 (Step 404). Controller 60 may command racking (i.e., by directing an electronic command to tilt valve 48 causing upward tilting) of work tool at this time, as tilt cylinders 34 may not yet be stalled.

While performing step 404, controller 60 may check to see if the attempts to move work tool 14 are being successful. In particular, controller 60 may determine if an angle of work tool 14 (e.g., at a tip of work tool 14) has increased within an amount of time allotted for racking (Step 406). This determination may be made based on a comparison of position signals from sensor 66 with a threshold angle (e.g., about 0.03-0.4 radians). Controller 60 may continue to command racking of work tool 14 (i.e., control may cycle through steps 404 and 406) until either the tip angle increases by at least the threshold angle or until the amount of time allotted for racking has expired. In the disclosed embodiment, the amount of time allotted for racking is about 1 sec.

When controller 60 determines that the tip angle of work tool 14 has increased by at least the threshold angle, controller 60 may then command lifting (i.e., by directing an electronic command to lift valve 46 causing upward raising) of work tool 14 (Step 408). While performing step 408, controller 60 may check to see if the attempts to lift work tool 14 are being successful. In particular, controller 60 may determine if the tip of work tool 14 was moved in a vertical direction by at least a threshold distance within an amount of time allotted for lifting (Step 410). This determination may be made based on a comparison of position signals from sensor 66 with a threshold distance (e.g., about 1-3% of a maximum lift range of work tool 14). Controller 60 may continue to command lifting of work tool 14 (i.e., control may cycle through steps 408 and 410) until either the work tool tip moves vertically by at least the threshold distance or until the amount of time allotted for lifting has expired. In the disclosed embodiment, this amount of time is about 0.5-1.5 sec. When controller 60 determines that the tip of work tool 14 has moved by at least the threshold distance, controller 60 may conclude that work tool 14 is no longer stalled, and control may return to step 400.

However, if controller 60 determines during completion of steps 410 or 406 that neither the tip angle nor the tip height has changed by the corresponding threshold values within the allotted amounts of time, controller 60 may command neutralization of powertrain 20, engagement of braking system 16, and lifting of work tool 14 (Step 412). In one example, controller 60 may command neutralization for a specified period of time (e.g., about 0.4-0.6 seconds). The primary purpose of neutralizing powertrain 20 may be to divert power normally transmitted from powertrain 20 through traction devices 22 instead to excavation system 38, thereby increasing a lifting capacity of lift cylinders 32. Braking system 16 may be engaged to reduce an amount that machine 10 rolls (or is pushed by work tool 14) away from the material engaged by work tool 14 during neutralizing of powertrain 20. Some machine movement may still occur, however, and this movement may help to dislodge or loosen the material causing stall. During completion of step 412, controller 60 may again check to see if the tip of work tool 14 has moved vertically by at least the threshold distance within an amount of time allotted for lifting (Step 414). Controller 60 may continue to command lifting of work tool 14 (i.e., control may cycle through steps 412 and 414) until either the work tool tip moves vertically by at least the threshold distance or until the allotted amount of time for lifting has expired. In the disclosed embodiment, this amount of time is about 0.5-1.5 sec. When controller 60 determines during completion of steps 412 and 414 that the tip of work tool 14 has moved by at least the threshold distance, controller 60 may conclude that work tool 14 is no longer stalled, and control may return to step 400.

However, if controller 60 determines during completion of steps 412 and 414 that the tip of work tool 14 still has not moved by at least the threshold distance, controller 60 may again command neutralization of powertrain 20 (e.g., for about 0.4-0.6 sec.), along with disengagement of braking system 16 and lifting of work tool 14 (Step 416). By disengaging braking system 16 during neutralization of powertrain 20, the amount that machine 10 rolls (or is pushed by work tool 14) away from the material engaged by work tool 14 may be unrestricted, allowing for an increased amount of movement that can further help to dislodge or loosen the material.

Following completion of step 416, controller 60 may again command neutralization of powertrain 20 (e.g. for about 0.4-0.6 sec.), engagement of braking system 16, lifting of work tool 14, and dumping of work tool 14 (Step 418). The primary purpose of this step, after allowing rollback of machine 10 away from the material, may be to reposition work tool 14 to a new location and/or orientation that may not result in the same stall conditions previously encountered.

While performing step 418, controller 60 may check to see if the attempts to move work tool 14 are being successful. In particular, controller 60 may determine if the tip angle of work tool 14 has decreased by at least a threshold angle (Step 420). This determination may be made based on a comparison of position signals from sensor 66 with a threshold value (e.g., about 0.03-0.4 radians). If work tool 14 has not moved enough during completion of step 418 (e.g., by at least the threshold value, when checked at step 420), controller 60 may then determine if the angle of the work tool tip is below an efficiency threshold angle (e.g., about −0.3-0.4 radians) or if a time attempting to dump work tool 14 has exceeded an allotted amount of time (e.g., for about 0.5-1.5 sec.) (Step 422). The efficiency threshold angle may be an angle at which work tool 14 is no longer oriented to properly dig material with the tip, but is instead oriented too sharply downward. When oriented too sharply downward, work tool 14 would be pushing the material with an inside flat face of work tool 14 rather than cutting the material with an edge at the tip. As long as the work tool tip angle has not moved by at least the threshold amount, the work tool tip angle is not less than the efficiency threshold angle, and the time spent dumping of work tool 14 has not exceeded the allotted amount of time, control may loop through steps 418, 420, and 422. However, when any one of these conditions changes, control may proceed to step 424.

At step 424, controller 60 may command neutralization of powertrain 20, engagement of braking system 16, and lifting of work tool 14. As with step 418, the primary purpose of step 424 may be to reposition work tool 14 to a new location that may not result in the same stall conditions previously encountered. While performing step 424, controller 60 may check to see if the attempts to move work tool 14 are being successful. In particular, controller 60 may determine if the tip of work tool 14 has moved vertically by at least a threshold distance or if a time attempting to lift work tool 14 has exceeded an allotted amount of time (e.g., for about 0.5-1.5 sec.) (Step 426). This determination may be made based on a comparison of position signals from sensor 66 with a threshold distance (e.g., about 1-3% of a maximum lift range of work tool 14). As long as the work tool tip has not moved vertically by at least the threshold distance or the time attempting to lift work tool 14 has not exceeded the allotted amount of time, control may loop through steps 424 and 426. After completion of step 426 (i.e., after the work tool tip has moved vertically by at least the threshold amount or the time attempting to lift work tool 14 has exceeded the allotted amount of time), controller 60 may restore (i.e., stop neutralizing) powertrain 20, engage braking system 16, and hold work tool 14 at its current position for a minimum amount of time (e.g., about 0.4-0.6 sec) (Step 428), before returning control to step 400.

Returning to step 402, when controller 60 determines that lift cylinders 32 are not experiencing stall (step 402: N), controller 60 may then determine if tilt cylinder 34 is experiencing stall. In particular, controller 60 may monitor a pressure (e.g., a head-end pressure) of tilt cylinder 34 (e.g., via sensor 62) and a tilting movement of work tool 14, and compare the monitored pressure to a relief valve opening pressure (i.e., the opening pressure of main relief valve 54 or a tilt-specific relief valve—not shown) and a change in the work tool tip angle to a threshold angle (Step 430). As long as the pressure of tilt cylinder 34 is not near the relief valve opening pressure (e.g., within about 5-15%) and the work tool tip angle has changed by at least the threshold angle (e.g., about 0.03-0.4 radians), controller 60 may determine that tilt stall is not occurring and control may return to step 400.

However, when the pressure of tilt cylinder 34 is near the relief valve opening pressure or the work tool tip angle has changed less than the threshold angle, controller 60 may determine that work tool 14 has engaged a heavy or fixed object and has stalled (i.e., that tilt cylinder 34 has stopped moving, even though movement is being requested). When this occurs, controller 60 may attempt to correct the stall condition (e.g., to dislodge work tool 14 from the object or to otherwise loosen the object from its surroundings such that tilt cylinder movement may commence) by first commanding lifting of work tool 14 (Step 432). Controller 60 may command lifting at this time, as lift cylinders 32 may not yet be stalled.

While performing step 432, controller 60 may check to see if the attempts to move work tool 14 are being successful. In particular, controller 60 may determine if the tip of work tool 14 has moved vertically or if an amount of time allotted for lifting has elapsed (Step 434). This determination may be made based on a comparison of position signals from sensor 66 with a threshold distance (e.g., about 1-3% of the lift range of lift cylinders 32). Controller 60 may continue to command lifting of work tool 14 (control may cycle through steps 432 and 434) until either the tip height increases by at least the threshold distance or until the amount of time allotted for lifting has expired. In the disclosed embodiment, this amount of time is about 0.5-1.5 sec.

When controller 60 determines that the tip of work tool 14 has moved vertically by at least the threshold distance, controller 60 may then command racking of work tool 14 (Step 436). While performing step 436, controller 60 may check to see if the attempts to rack work tool 14 are being successful. In particular, controller 60 may determine if the tip angle of work tool 14 was increased by at least a threshold angle or if an amount of time allotted for racking has expired (Step 438). This determination may be made based on a comparison of position signals from sensor 66 with a threshold angle (e.g., about 0.03-0.4 radians). Controller 60 may continue to command racking of work tool 14 (i.e., control may cycle through steps 436 and 438) until either the work tool tip tilts by at least the threshold angle or until the amount of time allotted for racking has expired. In the disclosed embodiment, this amount of time is about 0.5-1.5 sec. When controller 60 determines that the tip of work tool 14 has tilted by at least the threshold angle, controller 60 may conclude that work tool 14 is no longer stalled, and control may return to step 400.

However, if controller 60 determines during completion of steps 438 or 434 that neither the tip angle nor the tip height has changed by the corresponding threshold values within the allotted amounts of time, controller 60 may command neutralization of powertrain 20, engagement of braking system 16, and racking of work tool 14 (Step 440). In one example, controller 60 may maintain neutralization for a specified period of time (e.g., about 0.4-0.6 seconds). The primary purpose of neutralizing powertrain 20 may be to divert power normally transmitted from powertrain 20 through traction devices 22 instead to excavation system 38, thereby increasing a racking capacity of tilt cylinder 34. Braking system 16 may be engaged to reduce an amount that machine 10 rolls (or is pushed by work tool 14) away from the material engaged by work tool 14 during neutralizing of powertrain 20. Some machine movement may still occur, however, and this movement may help to dislodge or loosen the material causing stall. During completion of step 440, controller 60 may again check to see if the tip angle of work tool 14 has increased by at least the threshold angle or if the time allotted for racking has expired (Step 442). Controller 60 may continue to command racking of work tool 14 (i.e., control may cycle through steps 440 and 442) until either the work tool tip tilts by at least the threshold angle or until the amount of time allotted for racking has expired. In the disclosed embodiment, this amount of time is about 0.5-1.5 sec. If controller 60 determines during completion of steps 440 and 442 that the tip of work tool 14 has tilted by at least the threshold angle, controller 60 may conclude that work tool 14 is no longer stalled, and control may return to step 400. Otherwise, control may advance to step 416 described above.

This disclosed excavation system may provide for enhanced machine movement efficiency by way of a unique stall correction process. The stall correction process may enhance efficiency by reducing an amount of time and power wasted when a particular actuator is stalled.

It will be apparent to those skilled in the art that various modifications and variations can be made to the excavation system of the present disclosure. Other embodiments will be apparent to those skilled in the art from consideration of the specification and practice of the excavation system disclosed herein. It is intended that the specification and examples be considered as exemplary only, with a true scope being indicated by the following claims and their equivalents.

What is claimed is:

1. An excavation system for a machine having a work tool, a traction device, and a powertrain configured to power the work tool and the traction device, the excavation system comprising:
a first actuator configured to move the work tool in a first direction;
at least a first valve configured to regulate fluid flow through the first actuator;
at least one sensor configured to generate a first signal indicative of a performance of the first actuator;
a second actuator configured to move the work tool in a second direction;
at least a second valve configured to regulate fluid flow through the second actuator; and
a controller in communication with the at least a first valve, the at least one sensor, the at least a second valve, and the powertrain, the controller being configured to:
make a first determination that the first actuator is experiencing a stall condition based on the first signal; and
selectively command neutralization of the powertrain and movement of the second actuator based on the first determination.

2. The excavation system of claim 1, wherein:
the first actuator is a lift cylinder; and
the second actuator is a tilt cylinder.

3. The excavation system of claim 2, further including a relief valve fluidly connected to at least one of the lift and tilt cylinders, wherein:
the at least one sensor is a pressure sensor associated with a head-end of the lift cylinder; and
the controller makes the first determination based on a comparison of a pressure at the head-end of the lift cylinder with an opening pressure of the relief valve.

4. The excavation system of claim 2, wherein:
the at least one sensor is a position sensor; and
the controller makes the first determination based on a comparison of a vertical distance the lift cylinder has moved and a threshold distance.

5. The excavation system of claim 2, wherein the at least one sensor includes:
a pressure sensor associated with a head-end of the lift cylinder; and
a position sensor.

6. The excavation system of claim 2, further including at least a second sensor configured to generate a second signal indicative of a performance of the tilt cylinder, wherein the controller is further configured to:
make a second determination that the tilt cylinder is experiencing a stall condition based on the second signal; and
selectively command movement of the lift cylinder based on the second determination.

7. The excavation system of claim 6, wherein:
the at least a second sensor includes a position sensor configured to generate a signal indicative of a tip angle of the work tool; and
the controller is configured to make the second determination based on a comparison of a tilt angle change of the work tool relative to a threshold angle.

8. The excavation system of claim 2, wherein the controller is further configured to:
monitor movement of the tilt cylinder during the stall condition of the lift cylinder; and
continue to command movement of the tilt cylinder until the tilt cylinder moves by a threshold amount or an amount of time allotted for movement of the tilt cylinder has expired.

9. The excavation system of claim 8, wherein the threshold amount is a minimum percent of a maximum range of the tilt cylinder.

10. The excavation system of claim 9, wherein the threshold amount is a minimum tip angle of the work tool.

11. The excavation system of claim 2, further including a braking system, wherein the controller is configured to selectively command engagement of the braking system when the powertrain is neutralized to inhibit rolling of the machine.

12. The excavation system of claim 11, wherein the controller is further configured to:
make a second determination that the lift cylinder is still experiencing the stall condition after a period of neutralization of the powertrain; and
selectively command neutralization of the powertrain and disengagement the braking system based on the second determination to allow the machine to roll away from a material engaged by the work tool.

13. The excavation system of claim 12, wherein the controller is further configured to command movements of the lift and tilt cylinders during neutralization of the powertrain and disengagement of the braking system to reposition the work tool as the work tool moves away from the material.

14. A method of controlling a machine having a powertrain, a work tool, and first and second actuators driven by the powertrain to move the work tool in different directions, the method comprising:
sensing a performance of the first actuator by at least one sensor;
wherein the first actuator is configured to move the work tool in a first direction and the second actuator is configured to move the work tool in a second direction;
making a first determination by a controller in communication with the at least one sensor, that the first actuator is experiencing a stall condition based on the sensed performance of the first actuator; and
selectively command neutralization of the powertrain and movement of the second actuator based on the first determination.

15. The method of claim 14, wherein:
the first actuator is a lift cylinder; and
the second actuator is a tilt cylinder.

16. The method of claim 15, wherein:
sensing the performance includes sensing a head-end pressure of the lift cylinder; and
making the first determination includes making the first determination based on a comparison of the head-end pressure with a relief valve opening pressure.

17. The method of claim 15, wherein:
sensing the performance includes sensing a position of the lift cylinder; and
making the first determination includes making the first determination based on a comparison of a vertical distance the lift cylinder has moved and a threshold distance.

18. The method of claim 15, further including:
sensing a performance of the tilt cylinder;
making a second determination that the tilt cylinder is experiencing a stall condition based on the sensed performance of the tilt cylinder; and selectively commanding movement of the lift cylinder based on the second determination.

19. The method of claim 15, further including selectively commanding braking of the machine when the powertrain is neutralized to inhibit rolling of the machine.

20. The method of claim 19, further including:
making a second determination that the lift cylinder is still experiencing the stall condition after a period of neutralization of the powertrain; and
selectively commanding neutralization of the powertrain and braking disengagement based on the second determination to allow the machine to roll away from a material engaged by the work tool.

21. The method of claim 20, further including commanding movements of the lift and tilt cylinders during neutralization of the powertrain and braking disengagement to reposition the work tool as the work tool moves away from the material.

22. A machine, comprising:
a frame;
a work tool;
lift arms pivotally connected at a first end to the frame and at a second end to the work tool;
lift cylinders connected between the frame and the lift arms;
at least one lift valve configured to regulate fluid flow through the lift cylinders;
at least a first sensor configured to generate a first signal indicative of a performance of the lift cylinders;
a tilt cylinder operatively connected between the frame and the lift arms;
at least one tilt valve configured to regulate fluid flow through the tilt cylinder;
at least a second sensor configured to generate a second signal indicative of a performance of the tilt cylinder;
a traction device connected to the frame and configured to propel the machine;
a powertrain operable to power the lift and tilt cylinders and the traction device;
a braking system configured to retard the traction device; and
a controller in communication with the at least one lift valve, the at least a first sensor, the at least one tilt valve, the at least a second sensor, the powertrain, and the braking system, the controller being configured to:
make a first determination that the lift cylinders are experiencing a stall condition based on the first signal;
selectively command neutralization of the powertrain and movement of the tilt cylinder based on the first determination;
selectively command engagement of the braking system when the powertrain is neutralized to inhibit rolling of the machine;
make a second determination that the lift cylinders are still experiencing the stall condition after a period of neutralization of the powertrain;
selectively command neutralization of the powertrain and disengagement the braking system based on the second determination to allow the machine to roll away from a material engaged by the work tool; and
selectively command movements of the lift and tilt cylinders during neutralization of the powertrain and disengagement of the braking system to reposition the work tool as the work tool moves away from the material.

* * * * *